April 10, 1928.

F. A. LIND 1,665,887

HOLDER FOR TIRES

Filed Aug. 10, 1923

INVENTOR
FREDERICK A. LIND
BY
ATTORNEY

Patented Apr. 10, 1928.                                                1,665,887

UNITED STATES PATENT OFFICE.

FREDERICK A. LIND, OF AKRON, OHIO, ASSIGNOR TO THE GOODYEAR TIRE & RUBBER COMPANY, OF AKRON, OHIO, A CORPORATION OF OHIO.

HOLDER FOR TIRES.

Application filed August 10, 1923. Serial No. 656,664.

My invention relates to a holder for displaying tires, and it has particular relation to an improved type of holder adapted to utilize the weight of the tire to maintain it in a vertical position, by means of a novel arrangement of parts.

The object of my invention is to provide a relatively inexpensive tire holder which shall consist of two separate and independent members which cooperate to employ the weight of the tire to produce a suitable clamping force for holding the tire in a vertical position.

Heretofore, tire holders have been manufactured comprising two units pivoted together so as to employ the weight of the tire to cause the holder to clampingly engage the tire when placed thereon. This type of holder is fairly effective, but in order to clampingly engage the tire, the feet of the holder must spread while in engagement with the floor, thus marring the surface thereof. By my invention, I utilize the same weight actuating principle but by means of a materially simplified device, having eliminated the pivotal connection, the possibility of injury to the supporting surface, and the necessarily accompanying assembling costs.

For a more comprehensive understanding of my invention, reference may now be had to the accompanying drawing of which:

Figure 2:
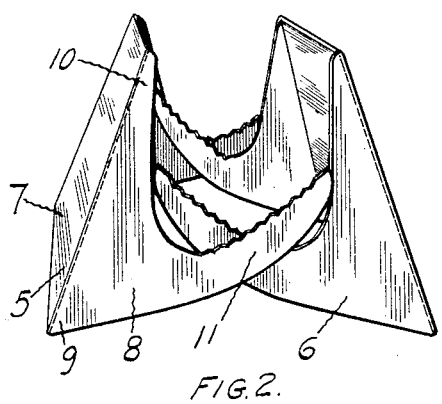
Fig. 2 is a perspective view of the two cooperating members in their proper relation adapted to receive a tire.

The tire holder consists of two separate independent substantially similar cooperating members 5 and 6 which are adapted to be disposed, one on each side of a tire, to support the same. Each of the members 5 and 6 consists of a side wall 7, which may be utilized for advertising space, and integral end members 8 disposed normally to the side members 7. The end members 8 each comprise a lower or supporting leg portion 9, an upwardly extending clamping arm 10, and an offset intermediately disposed arcuate weight supporting portion 11. The curvature of the upper surface of the hook shape portions 11 is such that some portion of the member, preferably the end thereof, will engage a portion of the side or tread surface of the tire when in position. The weight of the tire will cause the hook shape member 11 to tend to move in a direction away from the clamping arm 10, thus disposing the weight of the tire on the hook portion at a point near its end. The weight of the tire causes the hook portion to move about the lower end of the supporting leg 9 as a pivot, thus causing the clamping arm 10 to move toward the tire and clampingly engage the side wall of the same. On the opposite side of the tire is disposed a cooperating similarly shaped device, the hook members of which serve to cause the clamping member to move toward the opposite side of the tire. Thus the clamping arms of the two cooperating end members engage the two side walls of the tire in clamping engagement and substantially in lateral alinement and the weight of the tire is supported by the cooperating hook shape members thereof. The fact that the members 11 are of hook shape prevents the weight of the tire from causing the leg members 9 to slide away therefrom.

Figure 1:
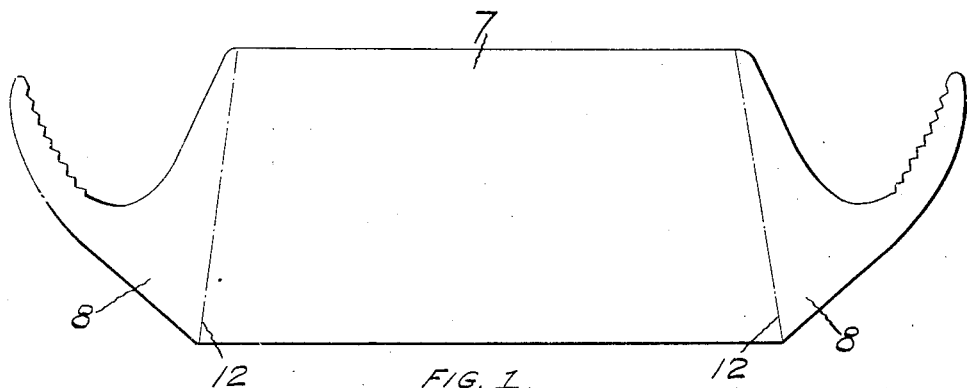
Fig. 1 is a view of a development of a sheet metal blank punched so as to form one of the two similar units of a tire holder constructed in accordance with my invention, which represents the first step of the manufacture thereof.

Each of the members 5 and 6 may preferably be manufactured from a single sheet metal stamping as illustrated in Fig. 1, the only manufacturing step necessary after the punching thereof being the bending of the end members 8 along the dot and dash lines 12.

Figure 3:
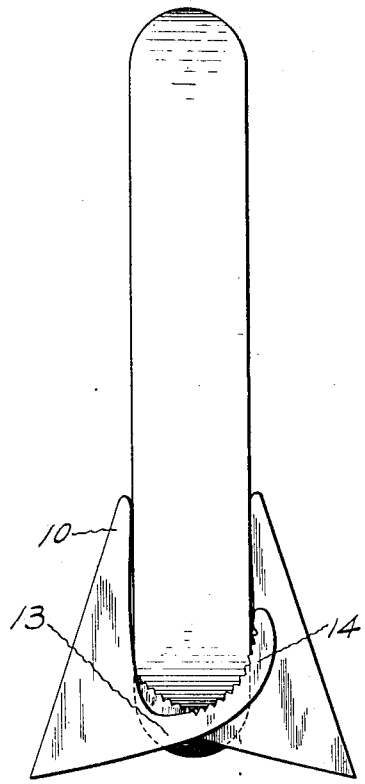
Fig. 3 is an end elevational view of a tire supported by a holder constructed in accordance with my invention.

In order to employ the same device for supporting tires of various diameters, the member 11 may consist of a relatively straight arm 13 disposed at an angle to the side member 7 and provided with a hook shape end 14, as best illustrated in Fig. 3. With this type of structure a smaller tire will be supported by a portion of the arm 11 closer to the clamping arm 10 than will a tire of larger diameter, the clamping engagement of the arms 10 being similarly effected in both instances.

From the foregoing description it will be apparent that I have provided a tire display holder consisting of two similar separate and independent members so constructed as to eliminate the necessity of a pivotal connection therebetween, thereby eliminating the manufacturing cost incident to the assembly of the two cooperating portions.

Although I have illustrated but one form which my invention may assume and have described in detail but a single application thereof, it will be apparent to those skilled in the art that it is not so limited but that many minor modifications and changes may be made therein, without departing from the spirit of my invention or from the scope of the appended claims.

What I claim is:

1. A tire holder comprising two separate members each provided with a portion adapted to engage one side wall of a tire casing and an arm-like portion adapted to extend beneath the tire in clamping engagement therewith.

2. A tire holder consisting of two separate independent members free from each other being adapted to cooperate to maintain a tire in a vertical position, each of said members comprising a side member and two hook shape end members disposed normally thereto.

3. A tire holder consisting of two separate independent members free from each other being adapted to cooperate to maintain a tire in a vertical position, each of said members comprising a side member and two end members disposed perpendicularly thereto, each of said end members comprising an arcuate portion adapted to engage the tire at substantially diametrically opposite points of the cross-section thereof.

4. A tire holder comprising two pairs of separate cooperating members free from each other being adapted to support a tire in a vertical position, each pair of members being movable independently of each other, each of said members comprising a supporting leg, a clamping arm, and an intermediately disposed offset hook member, said offset hook member being adapted to support the weight of the tire and to cause the clamping arm to clampingly engage the same.

In witness whereof, I have hereunto signed my name.

FREDERICK A. LIND.